US012282530B2

(12) United States Patent
Bondugula et al.

(10) Patent No.: US 12,282,530 B2
(45) Date of Patent: Apr. 22, 2025

(54) SECURE RESOURCE MANAGEMENT TO PREVENT FRAUDULENT RESOURCE ACCESS

(71) Applicant: EQUIFAX INC., Atlanta, GA (US)

(72) Inventors: Rajkumar Bondugula, Irving, TX (US); Michael McBurnett, Atlanta, GA (US)

(73) Assignee: EQUIFAX INC., Atlanta, GA (US)

( * ) Notice: Subject to any disclaimer, the term of this patent is extended or adjusted under 35 U.S.C. 154(b) by 268 days.

(21) Appl. No.: 17/597,605

(22) PCT Filed: Jul. 9, 2020

(86) PCT No.: PCT/US2020/041427
§ 371 (c)(1),
(2) Date: Jan. 13, 2022

(87) PCT Pub. No.: WO2021/011308
PCT Pub. Date: Jan. 21, 2021

(65) Prior Publication Data
US 2022/0261461 A1  Aug. 18, 2022

Related U.S. Application Data

(60) Provisional application No. 62/875,814, filed on Jul. 18, 2019.

(51) Int. Cl.
G06F 21/31 (2013.01)
G06F 21/60 (2013.01)

(52) U.S. Cl.
CPC ............ *G06F 21/31* (2013.01); *G06F 21/602* (2013.01)

(58) Field of Classification Search
None
See application file for complete search history.

(56) References Cited

U.S. PATENT DOCUMENTS 8,918,791 B1 *  12/2014  Chudgar ................. G06F 9/526
718/104
9,935,772 B1 *  4/2018  Madisetti ............ G06F 21/6209
(Continued)

OTHER PUBLICATIONS

Desai H, Kantarcioglu M, Kagal L. A hybrid blockchain architecture for privacy-enabled and accountable auctions. In2019 IEEE International Conference on Blockchain (Blockchain) Jul. 14, 2019 (pp. 34-43). IEEE. (Year: 2019).*

Zyskind G, Nathan O, Pentland A. Enigma: Decentralized computation platform with guaranteed privacy. arXiv preprint arXiv:1506.03471. Jun. 10, 2015. (Year: 2015).*

(Continued)

*Primary Examiner* — James R Turchen
(74) *Attorney, Agent, or Firm* — Kilpatrick Townsend & Stockton LLP

(57) ABSTRACT

Systems and methods for secure resource management are provided. A secure resource management system includes a resource record repository, such as a secure database or a blockchain, for storing resource records for resources. The resource records contain information of resource providers, information of resource users having a right to obtain resources, and resource transaction histories. Responsive to a request to verify an authorized user of a resource, the secure resource management system further queries the resource record repository, retrieves the resource record, determines the resource user currently having a right to obtain the resource as the authorized user of the resource, and transmits the verification result in response to the request. The verification result identifies the authorized user of the resource and can be used to grant access to the resource by the authorized user.

20 Claims, 8 Drawing Sheets

(56) References Cited

U.S. PATENT DOCUMENTS

| | | | |
|---|---|---|---|
| 2009/0183247 A1* | 7/2009 | Kasper | H04L 63/0892 726/7 |
| 2015/0142979 A1* | 5/2015 | Lee | H04W 4/50 709/226 |
| 2015/0262177 A1* | 9/2015 | Mohammed | G06Q 20/401 705/44 |
| 2018/0143975 A1* | 5/2018 | Casal | G06F 40/51 |
| 2019/0044700 A1* | 2/2019 | Leddy | G06Q 30/0185 |
| 2019/0259034 A1* | 8/2019 | Frank | G06Q 20/24 |
| 2019/0303758 A1* | 10/2019 | Meaker | G16H 10/60 |
| 2019/0392164 A1* | 12/2019 | Dutta | H04L 9/0825 |
| 2020/0242595 A1* | 7/2020 | Harrison | H04L 67/1097 |
| 2020/0252404 A1* | 8/2020 | Padmanabhan | H04L 63/061 |
| 2020/0320454 A1* | 10/2020 | Almashor | G06Q 10/04 |
| 2020/0349261 A1* | 11/2020 | Koorella | G06F 21/6209 |
| 2021/0234704 A1* | 7/2021 | Kempf | H04L 9/3242 |

OTHER PUBLICATIONS

Wang S, Wang X, Zhang Y. A secure cloud storage framework with access control based on blockchain. IEEE access. Jul. 23, 2019; 7:112713-25. (Year: 2019).*

Guo H, Li W, Nejad M, Shen CC. Access control for electronic health records with hybrid blockchain-edge architecture. In2019 IEEE International Conference on Blockchain (Blockchain) Jul. 14, 2019 (pp. 44-51). IEEE. (Year: 2019).*

PCT/US2020/041427, "International Search Report and Written Opinion", Oct. 13, 2020, 12 pages.

Canadian Application No. CA3,147,600, Office Action, Mailed On Jan. 9, 2024, 4 pages.

European Application No. EP20750052.1, Office Action, Mailed On Jan. 4, 2024, 5 pages.

Canadian Application No. CA3,147,600, Office Action, Mailed On Nov. 7, 2024, 4 pages.

* cited by examiner

SECURE RESOURCE MANAGEMENT TO PREVENT FRAUDULENT RESOURCE ACCESS

CROSS-REFERENCE TO RELATED APPLICATIONS

This claims priority to U.S. Provisional Application No. 62/875,814, entitled "Secure Resource Management to Prevent Fraudulent Resource Access," filed on Jul. 18, 2019, which is hereby incorporated in its entirety by this reference.

TECHNICAL FIELD

This disclosure relates generally to increasing the security of resource management by preventing fraudulent access to resources.

BACKGROUND

Resource management, or more specifically resource access control, becomes more and more challenging as various resources now can be conveniently acquired, accessed, and transferred online. For example, a user can acquire an online storage resource for a fixed term through online transactions with a resource provider of the online storage resource, and access the online storage resource over the Internet. If the user later decides that he no longer needs the online storage resource, the user can transfer the unused term of the online storage resource to another user or entity, again through online transactions with the other user or entity. Similarly, for monetary resources, a creditor can acquire the right to the resource, obtain the resource, or transfer the right to the resource through online transactions.

This online nature of the resource access and transfer makes fraudulent accesses of the resources easier than before. For example, a user who acquired a resource and later transferred the resource might still have the means, such as credentials or tokens, to access the resource even after the transfer. Likewise, the user might transfer the rights of the same resource to multiple subsequent users by fraud. As a result, the resource provider might end up providing resources to multiple users and a transferee of the resource might have acquired a resource that has been depleted by other transferees.

The problem might be partially solved by enhancing the security measures at the resource provider by timely revoking the access right of a user if the user has transferred his access to the resource to another user. However, this approach requires the resource provider to implement sophisticated resource access control mechanisms. Not all resource providers have the capabilities to do so. The fraudulent access of the resource described above remains to be a big threat to these resource providers.

SUMMARY

Various aspects of the present disclosure involve providing a centralized secure resource management system to prevent fraudulent resource access. In one example, a secure resource management system includes a resource record repository and a resource verification subsystem. The resource record repository is configured for storing a resource record for a resource which contains information of a resource provider of the resource, information of resource users having a right to obtain the resource, and a resource transaction history. The resource verification subsystem is configured for receiving a request to verify an authorized user of the resource, querying the resource record repository to retrieve the resource record responsive to receiving the request, and determining, based on the resource record, a resource user currently having a right to obtain the resource as the authorized user of the resource. The resource verification subsystem is configured for transmitting, to a remote computing device, a verification result identifying the authorized user of the resource. The verification result is useable to grant access to the resource by the authorized user.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

BRIEF DESCRIPTION OF THE DRAWINGS

The foregoing, together with other features and examples, will become more apparent upon referring to the following specification, claims, and accompanying drawings.

DETAILED DESCRIPTION

Figure 1:
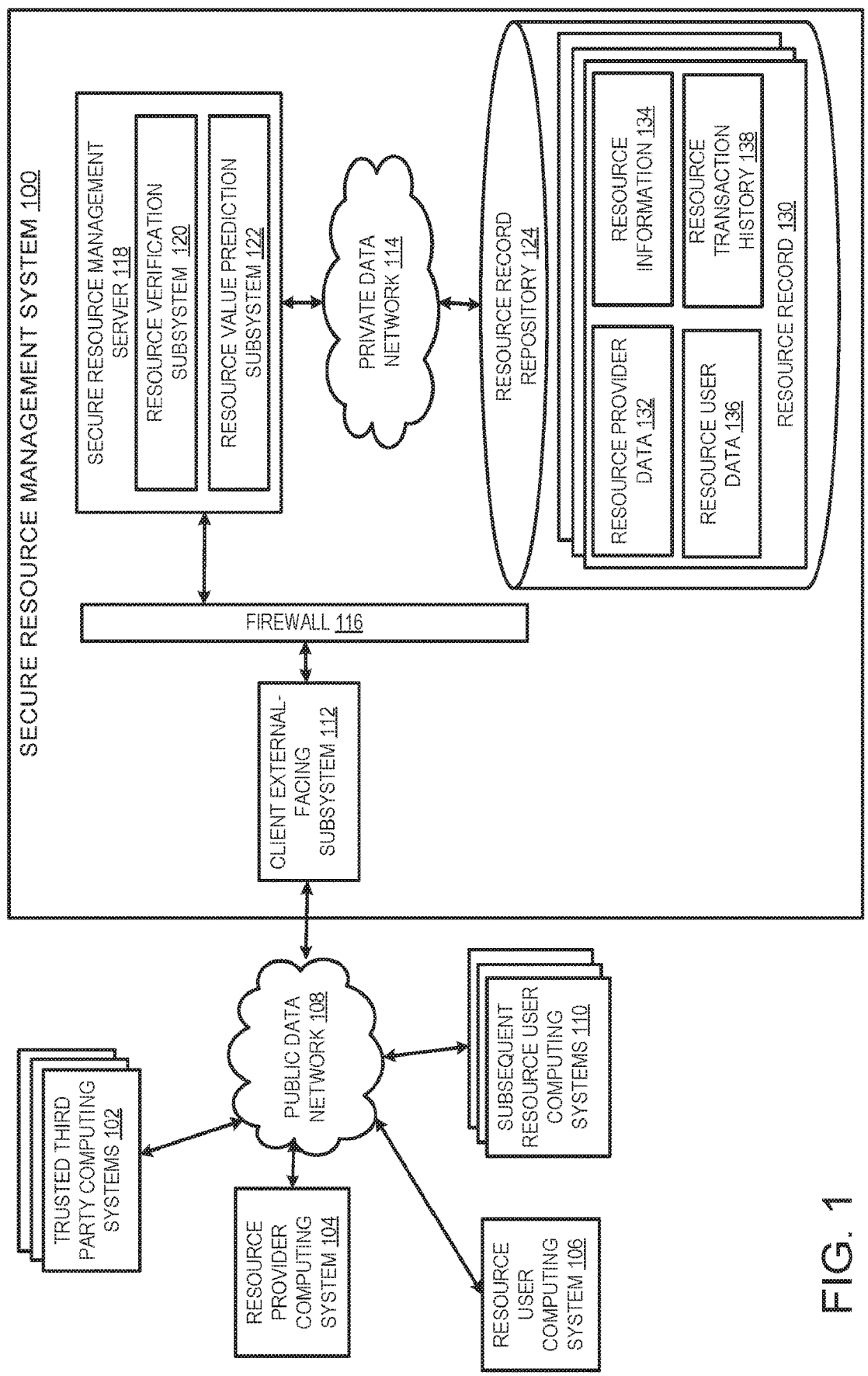
FIG. 1 is a block diagram depicting an example of a secure resource management system for securely recording and maintaining resource records related to resources, according to certain aspects of the present disclosure.

Certain aspects and features of the present disclosure involve providing a centralized secure resource management system to prevent fraudulent resource access. In one example, the secure resource management system maintains a resource record repository for storing resource records of various resources. The resource records contain information of resource providers of the resources, information of resource users of the resources, and resource transaction histories. A resource user refers to a user authorized to access a resource or having a right to obtain the resource. The resource record repository can be implemented in a secure database, a blockchain, or a combination of both.

The secure resource management system can use the resource record repository to serve verification requests. For example, if the secure resource management system receives a request to verify an authorized user of a resource, the secure resource management system queries the resource record repository to retrieve the resource record and identifies the current authorized user of the resource. The secure resource management system returns the verification result identifying the authorized user of the resource in response to the request. The resource provider can provide the authorized user access to the resource according to the verification result, such as by distributing the resource to the authorized user.

The request can be sent by a resource provider in order to confirm that the resource user requesting access to the resource is an authorized user. The request can also be sent by a subsequent resource user to whom the current resource user is to transfer the right to the resource. In this way, the resource provider (or the subsequence resource user) can verify the authenticity of the resource user and the amount of the resource before distributing the resource (or before acquiring the right to the resource from the current resource user). In some examples, the subsequent resource user may also request the secure resource management system to determine the value of the resource or the likelihood that the resource provider will distribute the resource before accepting the transfer of the resource.

The distribution of the resource can be made directly from the resource provider to the resource user, or through the secure resource management system or a trusted third party. Responsive to each resource distribution, the resource user, the resource provider, or the trusted third party can report the resource distribution to the secure resource management system so that the resource record repository can be updated to include the distribution transaction. Likewise, for each resource right transfer, the current resource user or the subsequence resource user can report the transfer to the secure resource management system so that the resource record repository can be updated to reflect the transfer and the current authorized user of the resource.

As described herein, certain aspects provide improvements to resource management by solving the fraudulent access problems that are specific to the Internet. As discussed above, the online nature of resource access and transfer makes the fraudulent access of the resources easier to implement and harder to detect. The centralized secure resource management system in the present disclosure keeps track of each transaction regarding a resource and maintains a secured copy of the records in a secure repository such as a secure database or a blockchain. This allows the resource provider, subsequent users of the resource, or other entities to verify the authenticity of the resource and the authorized user before distributing or acquiring the resource. By utilizing secure computer technologies, such as data encryption, blockchain, or secure database, this secure verification solution significantly reduces the chances of fraudulent access to resources.

The centralized secure resource management system can reduce the burden of implementing secure resource access control mechanisms from individual resource providers. Additionally or alternatively, because the secure centralized resource verification system can be implemented with highly complicated protection mechanisms, the security of the resource access control process provided by the system is more secure than the access control implemented by individual resource providers.

These illustrative examples are given to introduce the reader to the general subject matter discussed here and are not intended to limit the scope of the disclosed concepts. The following sections describe various additional features and examples with reference to the drawings in which like numerals indicate like elements, but should not be used to limit the present disclosure.

Operating Environment Example for Secure Resource Management System

FIG. 1 is a block diagram depicting an example of a secure resource management system 100 in which resource records concerning parties and transactions related to the resources are securely recorded and maintained. These resource records can be utilized to verify a resource and its authorized user when needed. The secure resource management system 100 is a specialized computing system that may be used for processing large amounts of data using a large number of computer processing cycles.

The secure resource management system 100 shown in FIG. 1 includes a secure resource management server 118 that is configured for managing transactions involving a resource and for verifying the authorized user of the resource. The secure resource management system 100 further includes a resource record repository 124 configured for securely storing resource records 130 each describing certain aspects associated with a resource. For example, the resource record 130 for a resource may include resource information 134 that describes the type of the resource, the identifier of the resource, the quantity of the resource, the effective date of the resource, the schedule for resource distribution, the remaining unused amount of the resource, and so on. For instance, if the resource is an online storage resource, the resource information 134 can indicate the resource being an online storage resource. The resource information 134 for the online storage resource may further include information such as a serial number associated with the online storage resource, the capacity of the online storage resource, the time period that the storage resource can be used, the network address of the storage resource, and so on. For a monetary resource, the resource information 134 may include the type or nature of the resource (e.g. a fund or a loan repayment), the total amount of the fund or loan, the schedule for the fund distribution or loan payment, the account number of the fund or loan, the remaining balance of the loan, and others.

The resource record 130 for the resource may also include resource provider data 132 containing various information about the resource provider of the resource, such as the name, address, identification of the resource provider. Other information, such as data related to the capability of the resource provider timely providing the resource, may also be included. If the resource provider is a company or an organization, such as a company providing an online storage resource, the resource provider data 132 can include the name of the company, the network or physical address of the company, the identification (e.g. the taxpayer identification number (TIN)) of the company, the revenue of the company, the total capacity of the resource held by the company, and so on. If the resource provider is an individual or a group of individuals, such as a loan borrower providing loan payments, the resource provider data 132 may include the name, address, social security number (SSN) of the loan borrower. The resource provider data 132 may also include the income of the loan borrower indicating the capability of the loan borrower to timely distribute the monetary resource to a creditor.

Likewise, the resource records 130 also include resource user data 136 to record information about the authorized user of the resource. An authorized user of a resource can be an entity or an individual who has the right to access the resource or to receive the distribution of the resource from the resource provider or a trusted third party. An authorized user of a resource may also be referred to as "a user of the resource" or a "resource user" for simplicity. Distribution of the resource can involve providing the resource or a portion of the resource for accessing, exclusively using, claiming ownership, or otherwise executing the rights the authorized user has with regard to the resource.

Because the resource (or access to the resource) may be transferred from one authorized user to another authorized user, the resource user data 136 includes the information about the current authorized user and past authorized users of the resource. For each of the resource users, the resource user data 136 may include information of the resource user, such as the name, address, identification, and so on.

The resource record 130 for a resource further maintains resource transaction history 138 describing the transactions involving the resource. For example, the resource transaction history 138 may include entries for resource distributions and transfers. An entry for resource distribution in the resource transaction history 138 can contain the time of the distribution, the quantity of the resource being distributed, the recipient of the distribution (i.e., the subsequent authorized user), the way the resource is distributed (e.g., via providing authorized user login credentials to access the resource, or via sending the authorized user tokens or other electronic data indicating the distribution), and other information.

In some examples, the resource record repository 124 is implemented using a secure database by implementing secure mechanisms such as data encryption, access control, integrity control, data backup, or any combination thereof. The resource record repository 124 may also be implemented through a blockchain, where the information contained in the resource records 130 is securely stored in the blockchain. The blockchain is updated as new information is received at the resource record repository 124, such as when the resource is transferred from one user to another user, when a portion of the resource is being distributed, and so on.

In some examples, the blockchain is a hybrid blockchain including a private blockchain that is only accessible by the secure resource management system 100 and a public blockchain accessible by the public. The resource record repository 124 can store the detailed and sensitive information in the resource records 130 in the private blockchain, such as the resource provider data 132, the resource user data 136, detailed information in the resource information 134 and the resource transaction history 138. The resource record repository 124 can store an encrypted version of the resource transaction history 138 on the public blockchain. The encrypted version can include the hash of each of the entries in the resource transaction history 138.

In other examples, the blockchain is a public blockchain. Data contained in the resource record repository 124 are encrypted and stored in the public blockchain. Although the resource record repository 124 is publicly available, the content of the resource record repository 124 is not accessible without the decryption key. As such, sensitive information contained in the resource record repository 124 is still protected in the public blockchain.

Based on the resource record repository 124, the secure resource management server 118 can utilize a resource verification subsystem 120 to verify the authenticity of a resource, including the type of the resource, the remaining unused amount of the resource, the authorized user of the resource, the transactions involving the resource, and so on. For example, the resource verification subsystem 120 can be configured to receive a request to verify the authenticity of a resource. In response to such a request, the resource verification subsystem 120 communicates with the resource record repository 124 and query the resource records 130 to determine the resource record 130 for the requested resource. If the information contained in the request matches the resource record 130 for the requested resource, the resource verification subsystem 120 returns a message to the requesting computing device indicating the information about the resource in the request is authentic. Otherwise, the resource verification subsystem 120 returns a message showing the information about the resource in the request is not authentic.

The resource verification subsystem 120 can also be configured to provide authentic information about a resource. For example, the resource verification subsystem 120 can be configured to process a request for information such as the current authorized user and the unused amount of the resource. In response, the resource verification subsystem 120 can query and retrieve the resource record 130 for the resource from the resource record repository 124 to identify and return the requested information.

If the resource record repository 124 is implemented using a hybrid blockchain, the public blockchain can be utilized to verify the authenticity of transactions involving a resource, such as a transfer of the resource or distribution of the resource. For example, an entity that wants to verify the authenticity of a transaction involving a resource can submit, using a computing device, information associated with the transaction to the secure resource management server 118. The secure resource management server 118 generates a hash for the querying transaction using the same hashing method used to generate the hash stored on the public blockchain. The secure resource management server 118 can submit the generated hash to the public blockchain for verification. Additionally, or alternatively, the secure resource management server 118 can return the generated hash to the requesting entity so that the requesting entity can verify the authenticity of the transaction itself using the public blockchain. If the public blockchain returns a match to the generated hash, the query transaction can be determined to be an authentic transaction that indeed occurred; otherwise, the query transaction is not an authentic transaction.

The secure resource management server 118 further includes a resource value prediction subsystem 122. The resource value prediction subsystem 122 can be configured to build and use a model for predicting an expected value of a resource based on the data about the resource stored in the resource record repository 124. In some examples, the model is configured to predict a likelihood (e.g. a probability or a possibility) of the resource being distributed within a certain time period. The model is further configured to predict a quantity or an amount associated with the remaining resource. Based on these two predicted quantities, the resource value prediction subsystem 122 can calculate the expected value of the remaining undistributed resource. As will be discussed below, the expected value of the remaining resource can be useful to a subsequent user of the resource when determining whether to accept the transfer of the resource from a previous authorized user. Additional details about predicting the value of the remaining resource are provided below with regard to FIG. 6.

The secure resource management system 100 also includes a client external-facing subsystem 112 including one or more computing devices to provide a physical or logical subnetwork (sometimes referred to as a "demilitarized zone" or a "perimeter network"). The client external-facing subsystem 112 is configured to expose certain online functions of the secure resource management system 100 to an untrusted network, such as the Internet or another public data network 108. In some aspects, the client external-facing subsystem 112 can be implemented as edge nodes, which provide an interface between the public data network 108 and a cluster computing system, such as a Hadoop cluster used by the secure resource management system 100.

The client external-facing subsystem 112 is communicatively coupled, via a firewall device 116, to one or more computing devices forming a private data network 114. The firewall device 116, which can include one or more devices, creates a secured part of the secure resource management system 100 that includes various devices in communication via the private data network 114. In some aspects, by using the private data network 114, the secure resource management system 100 can house the resource record repository 124 in an isolated network (i.e., the private data network 114) that has no direct accessibility via the Internet or another public data network 108. If the resource record repository 124 is implemented using the hybrid blockchain as described above, the public blockchain can be accessed directly via Internet or another public data network 108, but not the private blockchain.

Various computing systems may interact with the secure resource management system 100 through the client external-facing subsystem 112, such as a resource provider computing system 104, a resource user computing system 106, one or more subsequent resource user computing systems 110, or one or more trusted third party computing systems 102.

A resource provider computing system 104 can include any computing device or other communication device operated by an individual, such as a consumer, or an entity, such as a company, an institute, an organization, or other types of entities. The resource provider computing system 104 can include executable instructions stored in one or more non-transitory computer-readable media. The resource provider computing system 104 can also include one or more processing devices that are capable of executing the resource provider computing system 104 to perform operations described herein. In some aspects, the resource provider computing system 104 can allow a user to engage in mobile commerce with a resource user computing system 106 or a subsequent resource user computing system 110.

For instance, the user or other entity accessing the resource provider computing system 104 can use the resource provider computing system 104 to engage in an electronic transaction with a resource user computing system 106 via an online service. An electronic transaction between the resource provider computing system 104 and the resource user computing system 106 can include, for example, the resource user computing system 106 being used to request a portion of the resource being distributed to or being accessed by the resource user computing system 106 through an online service, such as an email service, a VOIP service, a messaging service, or other online services that can deliver a request for the resource to the resource provider computing system 104. For example, the electronic transaction can include the resource user computing system 106 sending an email to an email account accessible through the resource provider computing system 104 for repayment of the loan. An electronic transaction between the resource provider computing system 104 and the resource user computing system 106 can also include the resource provider computing system 104 being used to distribute or provide access to the resource user computing system 106 via an online service, such as a resource distribution platform implemented by a third-party system or by the resource user computing system 106. For example, the electronic transaction can include the resource provider paying a portion of a loan to the resource user computing system 106 through an online banking service.

Responsive to each resource distribution transaction, the resource user computing system 106 is configured to report the resource distribution to the secure resource management system 100 so that the secure resource management server 118 can update the resource record repository 124 based on the transaction. The update may include an update to the resource transaction history 138 to include the resource distribution transaction and an update to the resource information 134 to update the remaining unused amount of the resource.

The resource user computing system 106 or each subsequent resource user computing system 110 may include one or more devices, such as individual servers or groups of servers operating in a distributed manner. A resource user computing system 106 or a subsequent resource user computing system 110 can include any computing device or group of computing devices operated by a seller, lender, or another provider of products or services. The resource user computing system 106 or the subsequent resource user computing system 110 can include one or more server devices that include or otherwise access one or more non-transitory computer-readable media. The resource user computing system 106 or the subsequent resource user computing system 110 can also execute an online service. The online service can include executable instructions stored in one or more non-transitory computer-readable media. The resource user computing system 106 or the subsequent resource user computing system 110 can further include one or more processing devices that are capable of executing the online service to perform operations described herein.

A user or other entity accessing the resource user computing system 106 can use the resource user computing system 106 to engage in an electronic transaction with a subsequent resource user computing system 110 via an online service. The electronic transaction can include transferring the rights to the resource from the authorized user of the resource to a subsequent resource user. After the transfer, the subsequent resource user becomes the current authorized user and the previous authorized user is no longer authorized to access the resource. Likewise, the subsequent resource user can transfer any remaining rights to the resource to another subsequent resource user.

Before a transfer, a subsequent resource user can utilize the associated subsequent resource user computing system 110 to communicate with the secure resource management system 100, e.g. through the client external-facing subsystem 112, to submit a request to verify the resource. The request may include verifying the authenticity of the resource and the transferor (i.e., whether the resource has remaining unused portion as transferor claims) and whether the transferor is indeed the current authorized user of the resource. The secure resource management server 118 may process the request as described above. Upon receiving the verification results, the subsequent resource user computing system 110 may continue the transfer transaction with the transferor accordingly. That is, the subsequent resource user computing system 110 can accept the transfer if the transferor is the current authorized user of the resource and the resource has a remaining unused portion as the transferor claims. The subsequent resource user computing system 110 can deny the transfer if the transferor is not the current authorized user of the resource or the remaining unused portion is different from what the transferor claimed.

In some examples, the subsequent resource user computing system 110 may also submit a request to the secure resource management system 100 to determine the value of the resource before accepting the transfer of the resource. The secure resource management system 100 can process such a request using the resource value prediction subsystem 122 as discussed above and return the predicted value of the resource to the subsequent resource user computing system 110. Based on the predicted value, the subsequent resource user may decide whether to proceed with the transfer transaction or not.

If the resource transfer transaction occurred, the subsequent resource user computing system 110 is further configured to report such a transfer to the secure resource management system 100 so that the secure resource management server 118 can update the resource record repository 124 based on the transaction. The update may include an update to the resource user data 136 by adding data about the new subsequent resource user, an update to the resource transaction history 138 to include the transfer transaction and other data impacted by the transaction. Likewise, for each subsequent resource distribution, the subsequent resource user computing system 110 is further configured to report the distribution to the secure resource management system 100 so that the resource record repository 124 can be updated accordingly.

In addition to distributing the resource to the resource user computing system 106 or subsequent resource user computing system 110, the resource provider computing system 104 may also be configured to distribute the resource to one or more trusted third parties through respective trusted third party computing systems 102. Each trusted third party computing system 102 may include one or more third-party devices (e.g., computing devices or groups of computing devices), such as individual servers or groups of servers operating in a distributed manner. A trusted third party computing system 102 can include any computing device or group of computing devices operated by a trusted third party such as a certified online resource distributor, an online resource platform, an online financial institute, etc. The trusted third party computing systems 102 can be configured for forwarding the distributed resource to the current authorized user of the resource and for storing, formatting, and transmitting data regarding the resource distribution transaction to the secure resource management system 100. Additional details regarding the secure resource management system 100 and the interactions between the various systems with the secure resource management system 100 are provided below with regard to FIGS. 2-7.

Figure 2A:
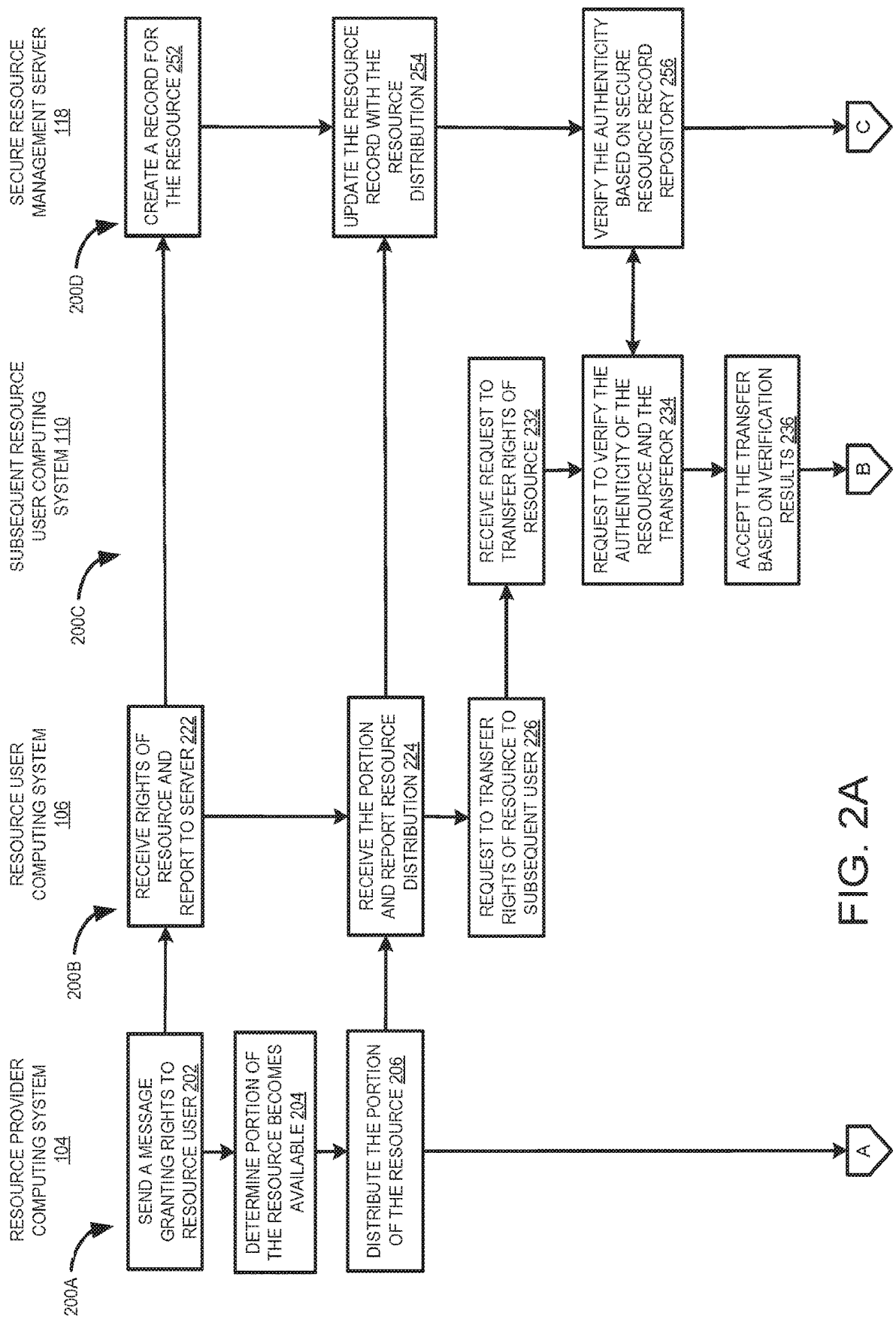
FIGS. 2A and 2B show several flowcharts illustrating examples of processes for secure resource management, according to certain aspects of the present disclosure.
Figure 2B:
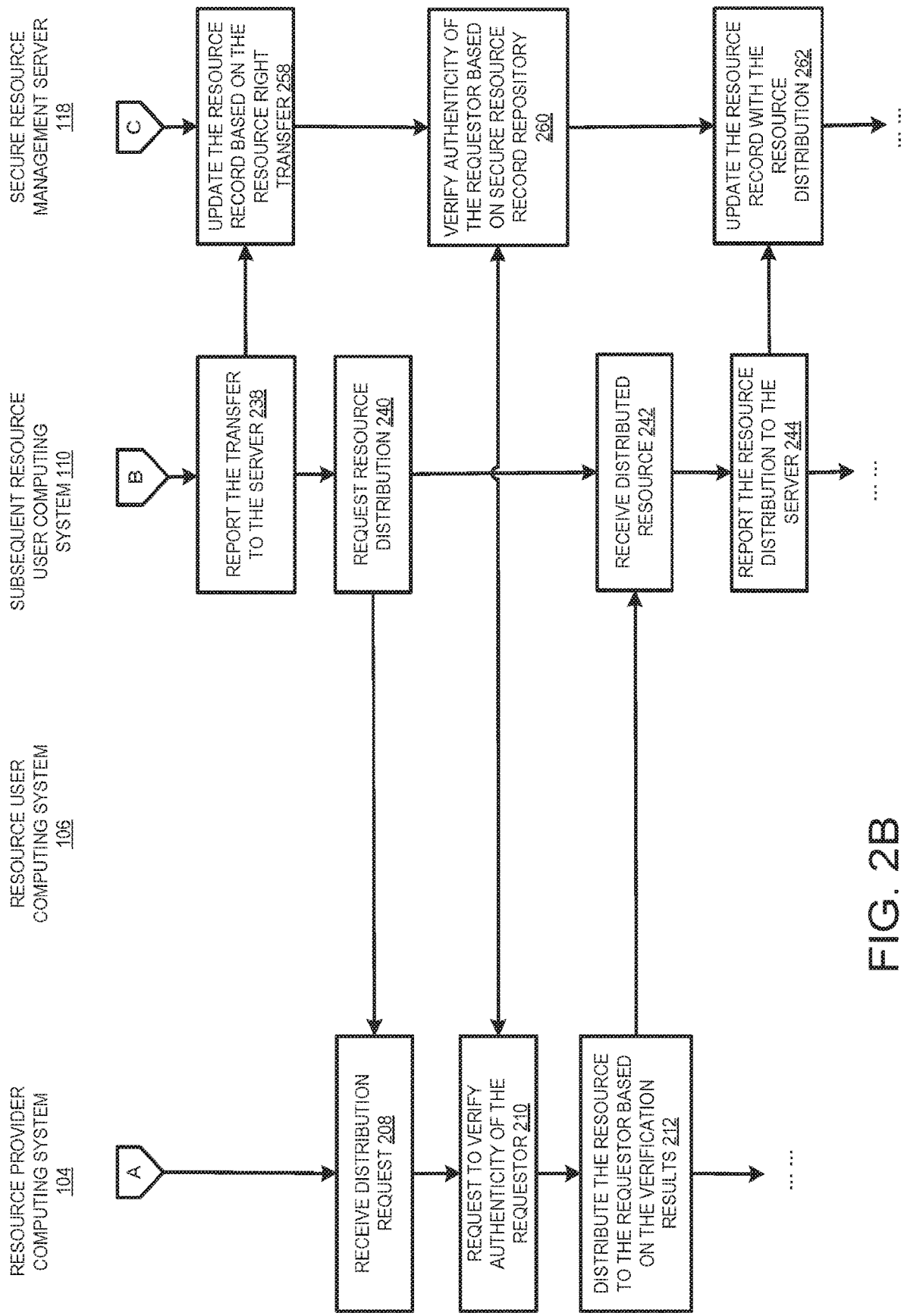

FIGS. 2A and 2B show several flowcharts illustrating several processes 200A, 200B, 200C, and 200D for secure resource management. For illustrative purposes, the processes 200A, 200B, 200C, and 200D are described with reference to implementations described above with respect to one or more examples described herein. Other implementations, however, are possible. In particular, the process 200A illustrates aspects of the resource provider computing system 104, the process 200B illustrates aspects of the resource user computing system 106, the process 200C illustrates aspects of a subsequent resource user computing system 110, and the process 200D illustrates aspects of the secure resource management server 118. The processes 200A, 200B, 200C, and 200D will be described together below.

In some aspects, the steps in FIGS. 2A and 2B may be implemented in program code that is executed by respective computing devices such as the resource provider computing system 104, the resource user computing system 106, the subsequent resource user computing systems 110, and the secure resource management server 118 depicted in FIG. 1. In some aspects of the present disclosure, one or more operations shown in FIGS. 2A and 2B may be omitted or performed in a different order. Similarly, additional operations not shown in FIGS. 2A and 2B may be performed.

At block 202, the process 200A involves the resource provider computing system 104 sending a message granting rights of using or owning a resource to a resource user. The message may also include information about the resource provider and the resource. In an example of an online storage resource, the message includes an agreement that the resource provider company will provide the resource according to terms agreed by both parties. In an example where the resource is a monetary resource, the message can include an agreement of the loan borrower (i.e., the resource provider) to repay the loan amount. The resource provider computing system 104 sends the message to the resource user computing system 106.

At block 222, upon receiving the message, the resource user computing system 106 further generates a reporting message describing the event of receiving the rights to the resource and information associated with the resource, the resource provider, and the resource user, or any other information needed for creating a resource record 130. In some examples, the resource user computing system 106 generates the reporting message in a format specified by the secure resource management system 100. The resource user computing system 106 further sends the reporting message to the secure resource management server 118. At block 252, the secure resource management server 118 creates or instructs the resource record repository 124 to create a resource record 130 for this resource based on the reporting message. The information in the resource record 130, such as the resource provider data 132, the resource information 134, the resource user data 136, and the resource transaction history 138 may be obtained from the reporting message.

At block 204, the resource provider computing system 104 determines or receives instructions that a portion of the resource is available for distribution. For example, if the resource is online storage resource, the resource provider computing system 104 may determine a portion of the resource is available by determining that some portion of the online storage spaces is released by existing users and become available for use by other users, or new online storage spaces are added and can be made available by users. If the resource is a monetary resource, the resource provider computing system 104 may detect or receive instruction that additional funds are added to the resource provider's account, and a certain portion of the funds can be distributed to the resource user.

At block 206, the resource provider computing system 104 distributes the portion of the resource to the resource user computing system 106. The portion of the resource can be distributed by providing a mechanism to the resource user computing system 106 for accessing the resource, such as by sending a token or login credentials that can be used to access a system where the portion of the resource can be retrieved or used. At block 224, the resource user computing system 106 receives the distributed portion of the resource from the resource provider computing system 104 or from the system where the portion of the resource can be retrieved. The resource user computing system 106 further reports the distribution of the resource by the resource provider computing system 104 to the secure resource management server 118. Similar to block 222, in some examples, the resource user computing system 106 generates the reporting message in the format specified by the secure resource management system 100.

At block 254, the secure resource management server 118 updates the resource record 130 based on the reporting message. For example, the secure resource management server 118 adds the resource distribution transaction to the resource transaction history 138 and updates the remaining unused amount of the resource in the resource information 134 based on the amount being distributed in the distribution transaction. Blocks 206, 224, and 254 may be repeated each time the resource provider computing system 104 distributes a portion of the resource to the resource user computing system 106.

At some point, the resource user may decide to transfer the unused resource to a subsequent user, because, for example, the resource user no longer has the need of using the resource or the resource user does not expect to receive the entire resource by a certain date. In that case, the process 200B proceeds to block 226 where the resource user computing system 106 requests to transfer the rights of the resource to the subsequent user. At block 232, the subsequent resource user computing system 110 associated with the subsequent user receives the request of the transfer. Before accepting the request, the subsequent resource user computing system 110 may send a request to the secure resource management server 118 to verify the resource, including the nature of the resource, the remaining unused quantity of the resource, the current authorized user of the resource, and so on. For example, a debt buyer may request the secure resource management server 118 to verify the loan, the amount remaining in the loan, the current creditor of the loan, etc. Upon receiving the verification request, the secure resource management server 118 performs the verification about the resource and the transferor based on the resource record repository 124 as described above with respect to FIG. 1.

Based on the verification results, the subsequent resource user may accept the resource transfer at block 236. In another example, the subsequent resource user computing system 110 may also request the secure resource management server 118 to predict the value of the remaining unused resource. The decision to accept the resource transfer may also be made based on the predicted value of the resource. After the rights to the resource are transferred from the resource user to the subsequent resource user, the subsequent resource user may utilize the subsequent resource user computing system 110 to report the transfer to the secure resource management server 118. Again, the reporting message may be generated in a format specified by the secure resource management system 100. The reporting message contains the information required to update the resource record 130 in the resource record repository 124, such as the information about the subsequent resource user, the amount of resource being transferred from the resource user to the subsequent resource user, and so on. At block 258, the secure resource management server 118 updates the resource record 130 based on the reporting message.

At block 240, the subsequent resource user computing system 110 sends a request to the resource provider computing system 104 to request the resource to be distributed. Because the resource provider might be unaware of the resource transfer between the resource user to the subsequent resource user, the resource provider might want to validate the authenticity of the subsequent resource user. As such, upon receiving the request for resource distribution at block 208, the resource provider can use the resource provider computing system 104 to send a request to the secure resource management server 118 at block 210 to verify the subsequent resource user. At block 260, the secure resource management server 118 determines whether the subsequent resource user is the current authorized user based on the resource record 130 and returns the verification results to the resource provider computing system 104.

If the subsequent resource user is indeed the current authorized user, the resource provider might distribute the resource or a portion thereof that is available to the subsequent resource user. At block 242, the subsequent resource user computing system 110 receives the distributed resource or the token to access the distributed resource. at block 244, the subsequent resource user computing system 110 further reports the resource distribution to the secure resource management system 100, such as via a reporting message as described above. Based on the report, the secure resource management server 118 updates the resource record 130 to reflect the resource distribution.

The subsequent resource user computing system 110 may keep receiving the distribution of the resource from the resource provider computing system 104 or may transfer the remaining unused resource to another subsequent resource user. For each transaction, the secure resource management server 118 receives a report to update the resource record 130. The processes described above may continue until there is no more unused resource or the current authorized user determines that the value of the resource becomes negligible.

Although FIGS. 2A and 2B describe that the secure resource management server 118 creates the resource record 130 for a resource when the resource provider grants the rights of the resource to the resource user, other implementations can also be used. For example, the resource record 130 for a resource can be created when the resource is transferred from the initial authorized user to a subsequent user and be updated for each transaction occurred afterward. This is because fraudulent requests for resources mostly occur after the resource is transferred leading to confusion for the resource provider as to which user is the authorized user.

In addition, for some resources, such as monetary resources like loans, regulations, and standards (such as Metro II) provide requirements and a reporting framework for loan origination and repayment information when reported to a credit reporting agency. In such an example, the information regarding the resource and the authorized user has already been recorded and no need to be duplicated in the resource record 130. In this example, the resource record 130 can be created after the resource is transferred from the initial creditor (the resource user) to a debt buyer or a debt collector (the subsequent resource user) and based on the reporting message regarding the transfer. From there, the debt buyer or debt collector can configure its subsequent resource user computing system 110 to report each payment made by the loan borrower (resource provider) to the secure resource management server 118. Likewise, if the loan is further transferred to another debt buyer or debt collector (another subsequent resource user), the subsequent debt buyer or debt collector can report the transfer and any loan payment to the secure resource management server 118.

Before acquiring the loan (i.e., accept the transfer), a debt buyer or debt collector can request the secure resource management server 118 to verify the loan, the amount remaining on the loan and the creditor of the loan. Further, as part of its decision to acquire the loan, the debt buyer or debt collector can request the secure resource management server 118 to predict the value of the loan. A similar process can be applied to other types of resources.

Figure 3:
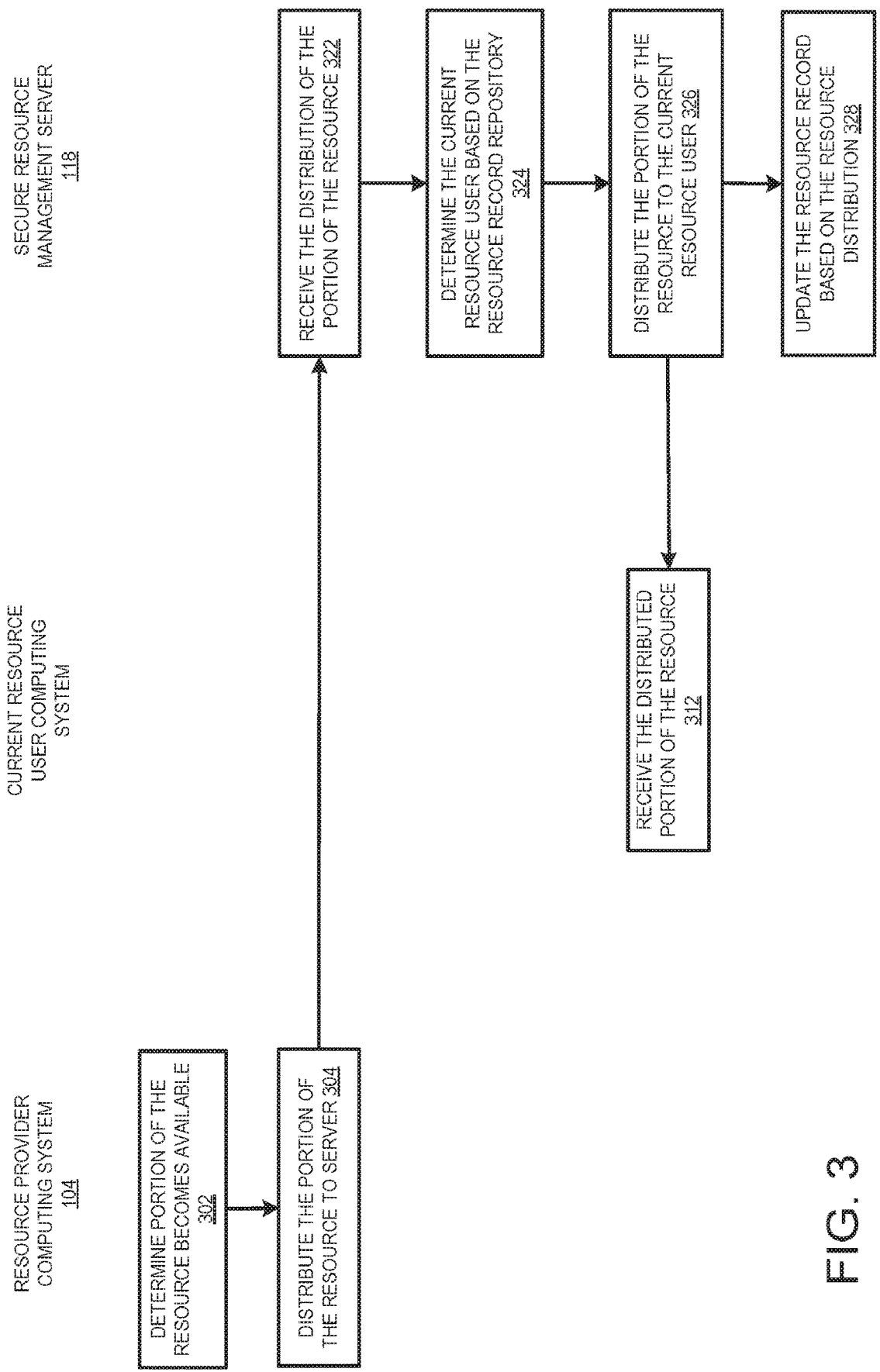
FIG. 3 is a flowchart showing an example of a resource provider distributing resources through the secure resource management server, according to certain aspects of the present disclosure.

FIG. 3 depicts an example of a resource provider distributing resources through the secure resource management server 118 according to aspects presented herein. At block 302, the resource provider determines, similar to block 204, that a portion of the resource becomes available for distribution. At block 304, the resource provider computing system 104 distributes the portion of the resource in a way similar to block 206. Different from block 206, the resource is distributed to the secure resource management server 118 instead of the current authorized user. This eliminates the burden of the resource user to report the resource distribution transaction to the secure resource management server 118.

At block 322, the secure resource management server 118 receives the distribution of the resource in a way similar to a resource user receiving the resource distribution as described with regard to blocks 224 and 242. At block 324, the secure resource management server 118 determines the current authorized user based on the resource records 130 stored in the resource record repository 124. At block 326, the secure resource management server 118 redistributes the portion of the resource to the current authorized user through the resource user computing device associated with the authorized user. The resource user computing device receives the distribution of the resource at block 312. At block 328, the secure resource management server 118 updates the resource record 130 based on the resource distribution.

Figure 4:
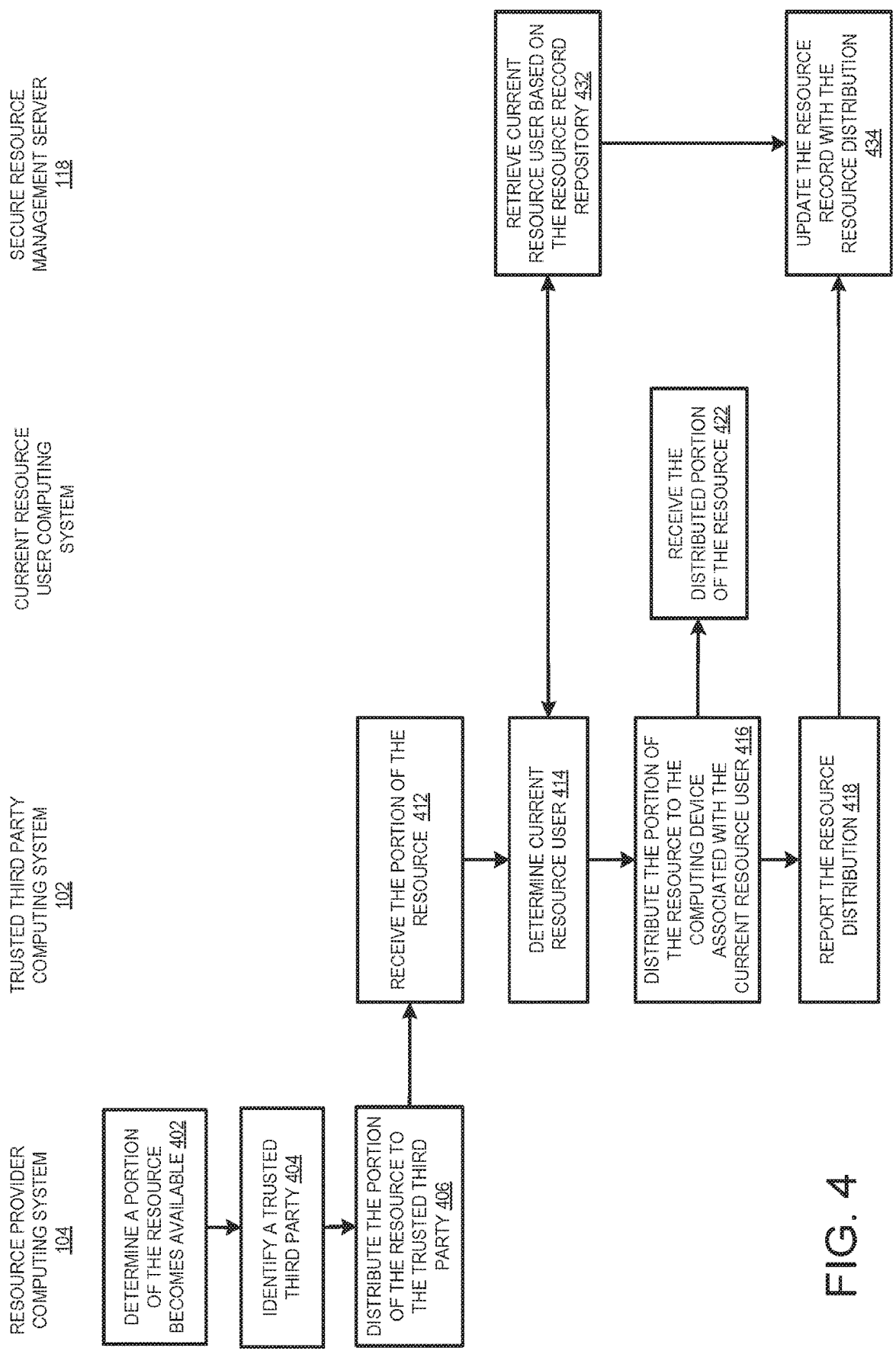
FIG. 4 is a flowchart showing an example of a resource provider distributing resources through a trusted third party, according to certain aspects of the present disclosure.

FIG. 4 depicts an example of a resource provider distributing resources through a trusted third party according to aspects presented herein. At block 402, the resource provider determines that a portion of the resource becomes available for distribution in a way similar to blocks 204 and 302. At block 404, the resource provider identifies a trusted third-party resource distributor. A trusted third party can be a certified online resource distributor, an online resource platform, an online financial institute, etc. The resource provider may identify the trusted third party by querying the secure resource management system 100 which may maintain a list of trusted third party resource distributors. Alternatively, or additionally, the resource provider may select a resource distributor that the resource provider trusts based on, for example, the third party's reputation or the resource provider's past experience with the third party.

At block 406, the resource provider computing system 104 distributes the portion of the resource to the trusted third party computing system 102. At block 412, the trusted third party computing devices 102 receives the portion of the resource and at block 414, the trusted third party computing devices 102 determines the current authorized user of the resource by querying the secure resource management server 118. In response to receiving the query, the secure resource management server 118 retrieves the information about the current resource user based on the resource record 130 stored in the resource record repository 124. Based on such information, the trusted third party computing devices 102 distributes the portion of the resource to the authorized user at block 416 through the corresponding resource user computing system 106 or subsequent resource user computing system 110. The computing system 106 associated with the current authorized user receives the distributed resource at block 422.

The trusted third party computing devices 102 further reports, at block 418, the resource distribution to secure resource management server 118, e.g. by sending a reporting message in a format specified by the secure resource management system 100. The secure resource management server 118, at block 434, receives the reporting message and updates the resource record 130 accordingly. Sending the resource to a trusted third party eliminates the burden of the resource user to report the resource distribution and the burden of the secure resource management server 118 for receiving and redistributing the resource.

Figure 5:
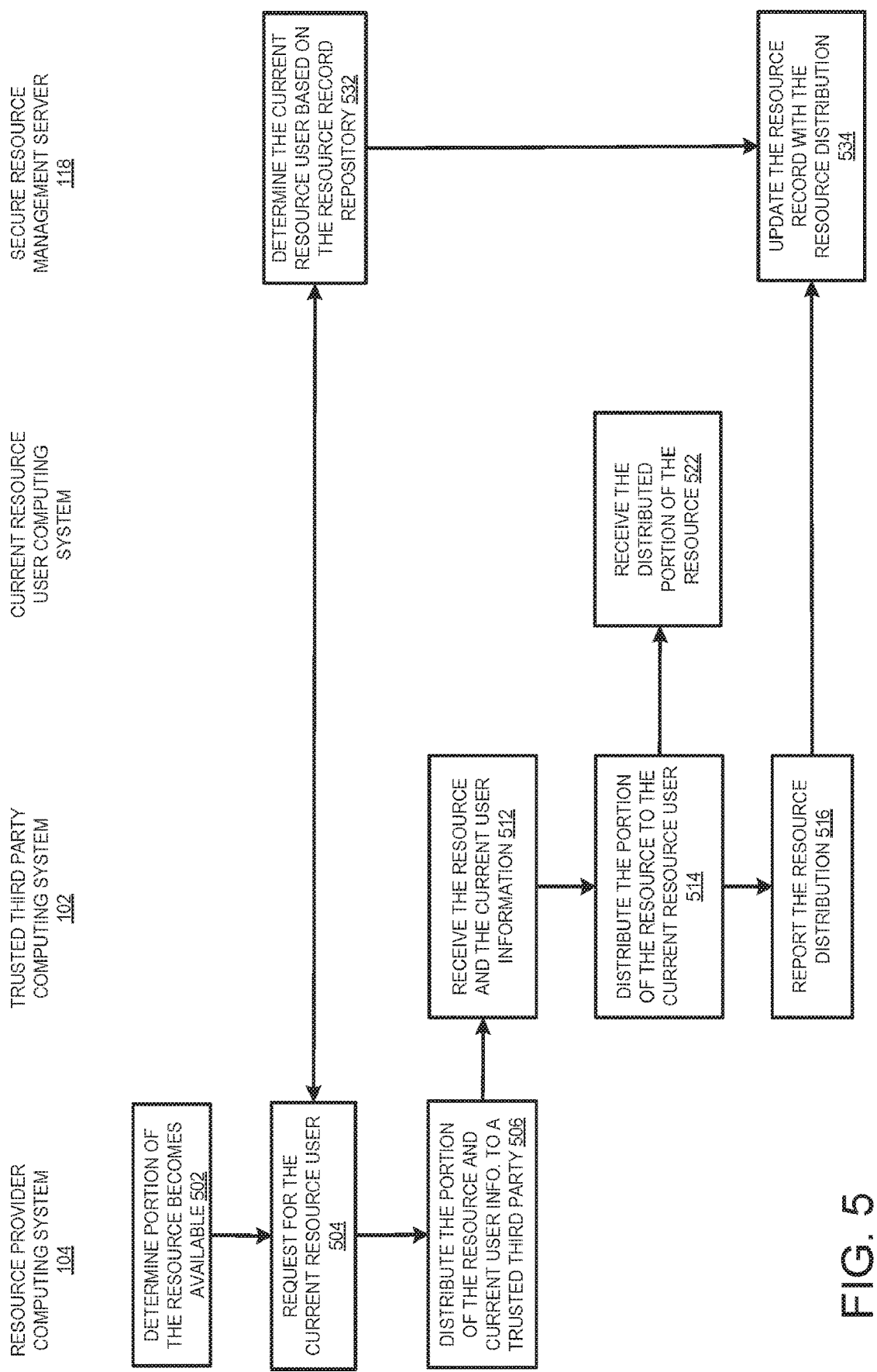
FIG. 5 is a flowchart showing another example of a resource provider distributing resources through a trusted third party, according to certain aspects of the present disclosure.

FIG. 5 depicts another example of a resource provider distributing resources through a trusted third party according to aspects presented herein. At block 502, the resource provider determines that a portion of the resource becomes available for distribution in a way similar to blocks 204, 302, and 402. At block 504, the resource provider computing system 104 communicates with the secure resource management server 118 to request the current authorized user of the resource. At block 532, the secure resource management server 118 identifies the current authorized user of the resource based on the resource record 130 in the resource record repository 124.

At block 506, the resource provider computing system 104 communicates with a trusted third-party computing device 102 to distribute the resource to the trusted third party. The resource provider computing system 104 also transmits the information about the current authorized user of the resource to the trusted third party computing devices 102. At block 512, the trusted third party computing device 102 receives the distributed portion of the resource and the current authorized user's information. At block 514, the trusted third party computing device 102 distributes the portion of the resource to the current authorized user through the computing system associated with the authorized user. The computing system of the resource user receives the distributed portion of the resource at block 522. At block 516, the trusted third party computing device 102 reports the resource distribution to the secure resource management server 118, based on which the secure resource management server 118 updates the resource record 130 for the resource in the resource record repository 124 at block 534.

A resource provider can use any of the resource distribution mechanisms described above with respect to FIGS. 3-5. The resource provider may also distribute the resource through other ways as long as the resource distribution is reported to the secure resource management server 118.

Figure 6:
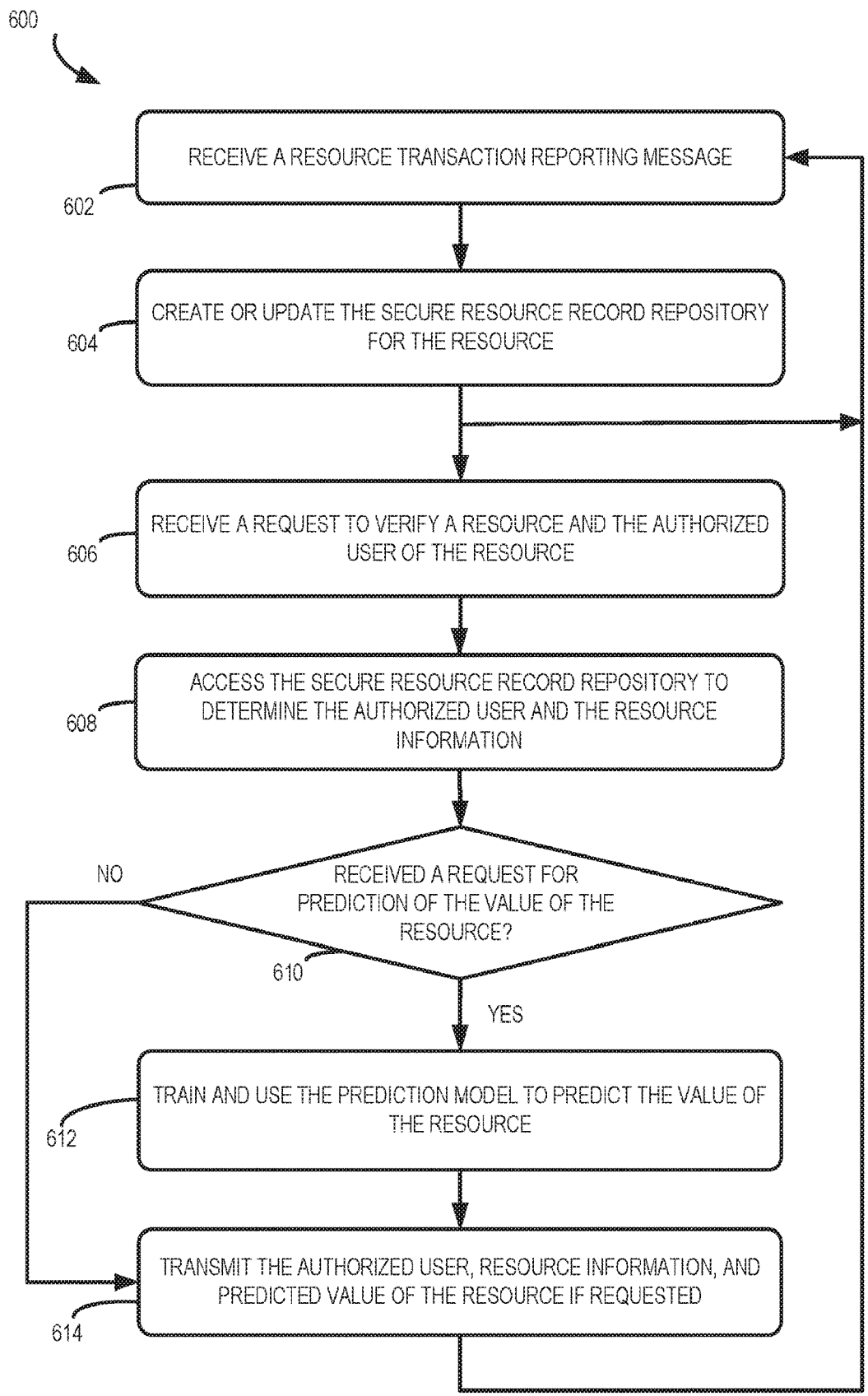
FIG. 6 is a flow chart illustrating an example of a process for managing resource transactions to prevent fraudulent access to resources, according to certain aspects of the present disclosure.

FIG. 6 is a flow chart illustrating an example of a process 600 for managing resource transactions to prevent fraudulent access to resources according to certain aspects of the present disclosure. For illustrative purposes, the process 600 is described with reference to implementations described above with respect to one or more examples described herein. Other implementations, however, are possible. In some aspects, the steps in FIG. 6 may be implemented in program code that is executed by one or more computing devices such as the secure resource management server 118 depicted in FIG. 1. In some aspects of the present disclosure, one or more operations shown in FIG. 6 may be omitted or performed in a different order. Similarly, additional operations not shown in FIG. 6 may be performed.

At block 602, the process 600 involves receiving a resource transaction reporting message. As described above with regard to FIGS. 1-5, the reporting message may be generated in response to the resource provider granting the rights of the resource to the resource user, a portion of the resource being distributed to the resource user with or without a trusted third party, or the resource being transferred from one user to another user.

At block 604, the secure resource management server 118 creates or updates a resource record 130 for the resource depending on the type of the reporting message. If the reporting message is for the resource provider granting the rights of the resource to the resource user, the secure resource management server 118 creates a resource record 130 for the resource in the resource record repository 124. If the reporting message is for resource distribution or transfer, the secure resource management server 118 updates the resource record 130 based on the transaction described in the reporting message. The process 600 may repeat blocks 602 and 604 as new reporting messages are received at the secure resource management server 118.

At block 606, process 600 involves receiving a request to verify a resource and the authorized user of the resource. The request may ask the secure resource management server 118 to verify the authenticity of a given resource and to determine if the remaining unused amount of the resource and its current authorized user match those stored in the resource record 130. The request may alternatively ask for detailed information about a given resource, including the identification of the resource, the remaining unused quantity, and the current authorized user. In response to the request, at block 608, the secure resource management server 118 searches the resource record repository 124 to retrieve the resource record 130 corresponding to the resource for verification.

At block 610, the secure resource management server 118 determines whether the request further asks for a prediction of the expected value of the resource. In some scenarios, such as when a subsequent resource user decides whether to accept the transfer of the resource, the subsequent resource user may request the secure resource management server 118 to provide an estimation or a prediction about the expected value of the resource to assess whether it is worth to accept the transfer. For example, a debt buyer may want to know the expected value of the remaining loan before acquiring the loan from the current creditor. If a request for predicting the expected value of the resource is received, the process 600 involves, at block 612, training and using a prediction model to predict the expected value of the resource at the time of the request.

In one example, the resource value prediction subsystem 122 can be used to construct a statistical model to predict the expected value of the resource. The statistical model requires two elements: a performance definition that stipulates the time frame and behavior necessary to identify what is to be predicted (Y), and predictors that are used to generate parameter estimates associated with a set of variables or attributes used to predict Y. The resource value prediction subsystem 122 predicts the expected value of the resource by predicting the likelihood (e.g. the probability or possibility) of the resource being distributed, such as the likelihood of a consumer repaying the loan. The resource value prediction subsystem 122 further determines a quantity or an amount associated with the remaining unused resource.

To predict the likelihood of the resource distribution, the performance definition can be defined over a limited time interval, such as one month, two months, six months, or other relatively short interval corresponding to the time span a resource user may attempt to obtain the resource before transferring it to another user. A positive resource distribution behavior is defined as one (1), and a failure or negative distribution behavior is defined as zero (0). The predicted outcome is a binary dependent variable.

The set of predictor attributes can be drawn from the resource records 130 for the resource provider, or alternative data other than the resource records 130. Knowledge such as how long the resource has been incompletely distributed can be included as attributes for predicting the likelihood of resource distribution. For instance, the resource value prediction subsystem 122 can determine the number of times a particular resource has been transferred to a subsequent resource user and how much of the original amount of resource remains in the transfer. These attributes could be used to predict the likelihood of resource distribution by the resource provider.

In one example, the model for predicting the probability of resource distribution is $$P(Y = 1) = f(XB), \qquad (1)$$

where Y takes the value 1 if the resource provider has distributed the resource, and 0 otherwise. The matrix X contains the candidate predictor attributes selected from the resource record 130 or alternative data and the vector B contains parameter estimates that determine the relationship between the predictors and Y. Various functional forms f can be used to estimate the parameters in this model, such as a logistic regression model or a probit model. Machine learning models such as neural networks can also be utilized to estimate the parameters of the model. Based on the selected model, the likelihood of resource distribution, which lies in [0, 1] and defines the probability of distribution of the entire resource, can be computed.

The model can be modified to accommodate partial resource distribution, which may be more useful to the subsequent resource user, such as subsequent debt buyers of loans. In this example, these debt buyers may not be interested in attempting to recover the entire amount of the loan (though they might like to) since the final recovery effort for the last remaining resources may have a cost that exceeds the return on the effort.

As mentioned above, the resource value prediction subsystem 122 is further configured to predict a quantity or an amount associated with the remaining unused resource. In one example, the quantity can be predicted as the amount of resource that has not been distributed to users. In this example, the model for calculating the quantity of resources that a subsequent user of the resource will receive is given by $$E(\text{received resource}) = P(Y = 1) \times (\text{amount of undistributed resource}). \quad (2)$$

In words, the expected value or expected amount a resource user may receive from the resource provider's distribution is determined by the characteristics of the resource provider defined in Eqn. (1) above, which generates the probability of resource distribution. This probability multiplied by the quantity of the undistributed resources will lead to the quantity of resources a resource user may receive. This model, however, may be simplistic as it does not make assumptions about the characteristics of the resource provider in terms of the provider's ability to distribute the resource.

For example, consider two resource providers each of whom originally granted monetary resources, such as $100,000 unsecured loans. One of the resource providers has lost his job and not found employment since while the other resource provider remains employed. Assume otherwise that these two resource providers are demographically identical, and that their other data such as credit data is identical. It is likely that the probability of repayment for these two individuals will be identical, which misleads the subsequent users, such as a debt collector, to apply the same recovery effort to both accounts. To provide a better prediction, the quantity of resources estimated to be recoverable can be adjusted by making use of the additional (alternative) datum that one resource provider is unemployed.

A new model for the quantity of resources that may be received can be used to provide a more accurate estimate of the portion of the resource remaining that might be recovered. For example, the amount of undistributed resource used in Eqn. (2) can be adjusted by considering the resource distribution history of the resource provider. With this adjustment, the model in Eqn. (2) becomes:

$$E(\text{received resource}) = \tag{3}$$
$$P(Y = 1) \times (\text{adjusted amount of resource to be received in interval } t).$$

Factors such as lack of employment will affect the quantity of resources that can be received by the resource user. The expected value of the amounts of resources to be received from resource providers may have a different rank ordering than that from Eqn. (2). This provides resource users with more realistic expectations about which resource providers are likely to provide the full amount of resources. This facilitates a subsequent resource user in its decision of whether to acquire the undistributed resource from the current authorized user and how much to pay for such undistributed resources.

The above process of predicting the quantity of resources to be received can be performed automatically. The data used to estimate each element of the above models are stored in structured data in the resource record repository 124, which might be a secure database or a hybrid chain of custody blockchain. The secure resource management server 118 can extract and convert the information from the resource record repository 124 to attributes describing amounts of undistributed resource, amounts distributed over time, and other elements used to predict the probability of distribution or to adjust the amount expected to be distributed.

As resource users receive resource distribution and update the resource record repository 124, the updated information can be used to automate the estimation or update estimates of E (received resource). The models that can be utilized to estimate the probability of resource distribution include, but are not limited to, logistic regression models, probit models, or machine learning models. These machine learning models could include neural networks, tree-based models, or deep learning models that can incorporate time into their estimation, such as convolutional neural networks. Log-linear regression, neural networks, or deep learning models can also be utilized to estimate the quantity of resources expected to be distributed. The secure resource management server 118 can run these models to predict the quantity of resources to be received on demand (i.e., upon receiving a request) or on a schedule to continuously refine the model and to update E (received resource). The refined model outputs reflect the latest updates in the resource records 130 from resource users and the resource provider.

At block 614, the process 600 involves the secure resource management server 118 transmitting the requested information, including the resource information, the authorized user, and the predicted value of the resource, to the requesting entity. The process 600 may repeat until the resource is fully distributed (e.g. the full storage capacity has been used for the full term, or the loan is paid off), or the current authorized user decides not to pursue the distribution of the resource (e.g., the current resource user no longer needs the resource and decides not to transfer it to a subsequent user or the creditor decides that the cost for debt collection exceeds the value of the debt).

Although the above description focuses on predicting the expected value of the resource, the secure resource management server 118 may also utilize the resource value prediction subsystem 122 or other subsystems to predict the expected loss of the resource. The expected loss of the resource measures the expectation on the amount of the resource for which a resource user or a subsequent resource user will not receive a distribution. Similar to the expected value of the resource, the expected loss of the resource can also be utilized by subsequent resource users to assess whether it is worth accepting the transfer of the resource.

To determine the expected loss of the resource, the secure resource management server 118 can construct and use a statistical model or a machine learning model to predict the likelihood of the resource not being distributed within a certain period of time. These models can be built in a way similar to the models used to predict the likelihood of the resource being distributed as discussed above. This predicted likelihood of the resource not being distributed can be combined with the predicted amount or the adjusted amount associated with the remaining unused resource as discussed above to determine the expected loss of the resource. For example, the expected loss of the resource can be determined by replacing P(Y=1) in Eqns. (1) or (2) with the predicted likelihood of the resource not being distributed within the time period.

Example of Computing Environment for Secure Resource Management

Figure 7:
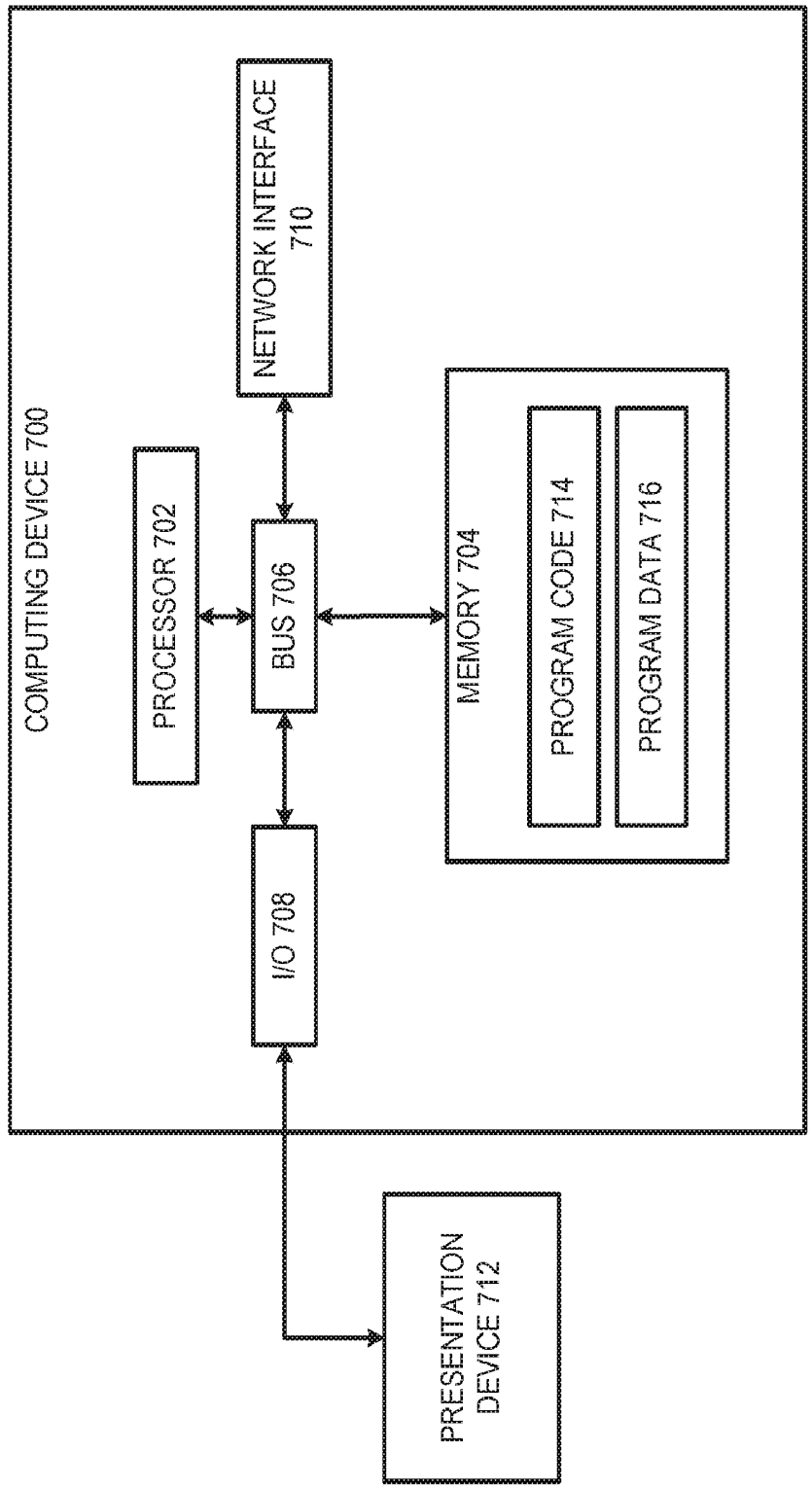
FIG. 7 is a block diagram depicting an example of a computing system suitable for implementing aspects of the techniques and technologies presented herein.

Any suitable computing system or group of computing systems can be used to perform the operations for the machine-learning operations described herein. For example, FIG. 7 is a block diagram depicting an example of a computing device 700, which can be used to implement the secure resource management server 118, the resource provider computing system 104, the resource user computing system 106, the subsequent resource user computing system 110 or the trusted third party computing device 102. The computing device 700 can include various devices for communicating with other devices in the secure resource management system 100, as described with respect to FIG. 1. The computing device 700 can include various devices for performing one or more secure resource management operations described above with respect to FIGS. 1-8.

The computing device 700 can include a processor 702 that is communicatively coupled to a memory 704. The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming languages include Hadoop, C, C++, C#, Visual Basic, Java, Scala, Python, Perl, JavaScript, ActionScript, etc.

The computing device 700 may also include a number of external or internal devices such as input or output devices. For example, the computing device 700 is shown with an input/output interface 708 that can receive input from input devices or provide output to output devices. A bus 706 can also be included in the computing device 700. The bus 706 can communicatively couple one or more components of the computing device 700.

The computing device 700 can execute program code 714 such as the resource verification subsystem 120 or the resource value prediction subsystem 122. The program code 714 may be resident in any suitable computer-readable medium and may be executed on any suitable processing device. For example, as depicted in FIG. 7, the program code 714 can reside in the memory 704 at the computing device 700 along with the program data 716 associated with the program code 714, such as the reporting message, the resource value prediction model, or the predicted value. Executing the program code 714 can configure the processor 702 to perform the operations described herein.

In some aspects, the computing device 700 can include one or more output devices. One example of an output device is the network interface device 710 depicted in FIG. 7. A network interface device 710 can include any device or group of devices suitable for establishing a wired or wireless data connection to one or more data networks described herein. Non-limiting examples of the network interface device 710 include an Ethernet network adapter, a modem, etc.

Another example of an output device is the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing device 700 using one or more data networks described herein. In other aspects, the presentation device 712 can be omitted.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification that terms such as "processing," "computing," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computing systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, or broken into sub-blocks. Certain blocks or processes can be performed in parallel.

The use of "adapted to" or "configured to" herein is meant as an open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Any aspects or examples may be combined with any other aspects or examples. Accordingly, it should be understood that the present disclosure has been presented for purposes of example rather than limitation, and does not preclude inclusion of such modifications, variations, or additions to the present subject matter as would be readily apparent to one of ordinary skill in the art.

The invention claimed is:

1. A method that includes one or more processing devices performing operations comprising:
  receiving a request to verify an authorized user of a resource and to provide a prediction of a value of the resource within a given time period;
  responsive to receiving the request, querying a hybrid blockchain comprising (a) a public blockchain having an encrypted version of a resource transaction history contained in a resource record and (b) a private blockchain storing a resource record that comprises information of a resource provider of the resource and information of resource users having a right to obtain the resource;
  determining, from the private blockchain, a resource user currently having a right to obtain the resource as the authorized user of the resource;
  predicting a likelihood of the resource being available or unavailable within a given time period; and
  transmitting, in response to the request, (i) a predicted value of the resource based at least in part on the likelihood of the resource being available or unavailable and (ii) a verification result to a remote computing device, the verification result identifying the authorized user of the resource and a remaining unused portion of the resource, wherein the verification result is useable to grant access to the resource by the authorized user.

2. The method of claim 1, further comprises:
  receiving a resource transaction reporting message; and
  updating a resource record repository based on the resource transaction reporting message.

3. The method of claim 1, further comprising:
  determining an amount of the resource available within the given time period; and
  generating the prediction of a value of the resource by combining the likelihood of the resource being available within the given time period and the amount of the resource available within the given time period.

4. The method of claim 1, further comprising:
  determining an amount of the resource available within the given time period; and
  generating a prediction of a loss of the resource by combining the likelihood of the resource being unavailable within the given time period and the amount of the resource associated with the given time period.

5. A secure resource management system, comprising:
  a resource record repository comprising a blockchain configured to store a resource record for a resource, the resource record comprising information of a resource provider of the resource, information of resource users having a right to obtain the resource, and a resource transaction history; and
  a resource verification subsystem comprising:
  a first processor; and
  a first non-transitory computer-readable medium comprising a first set of instructions executable by the first processor to perform first operations comprising:
    receiving a request to verify an authorized user of the resource and to provide a prediction of a value of the resource within a given time period,
    responsive to receiving the request, querying the resource record repository to retrieve the resource record,
    determining, based on the resource record, a resource user currently having a right to obtain the resource as the authorized user of the resource,
    predicting a likelihood of the resource being available or unavailable within a given time period; and
    transmitting, in response to the request, (i) a predicted value of the resource based at least in part on the likelihood of the resource being available or unavailable and (ii) a verification result to a remote computing device, the verification result identifying the authorized user of the resource and a remaining unused portion of the resource, wherein the verification result is useable to grant access to the resource by the authorized user.

6. The secure resource management system of claim 5, wherein the resource record repository is implemented in a secure database.

7. The secure resource management system of claim 5, wherein the resource record repository is implemented in a hybrid blockchain comprising a public blockchain and a private blockchain;
  the public blockchain is configured to store an encrypted version of the resource transaction history contained in the resource record; and
  the private blockchain is configured to store the resource record.

8. The secure resource management system of claim 5, wherein the resource record repository is implemented in a public blockchain.

9. The secure resource management system of claim 5, wherein the first operations further comprise:
  receiving a resource transaction reporting message; and
  updating the resource record repository based on the resource transaction reporting message.

10. The secure resource management system of claim 9, wherein the resource transaction reporting message comprises data describing a resource distribution or a resource transfer.

11. The secure resource management system of claim 5, further comprising a resource value prediction subsystem comprising:
  a second processor; and
  a second non-transitory computer-readable medium comprising a second set of code executable by the second processor to perform second operations comprising:
    training and using a model for predicting a likelihood of the resource being available within the given time period; and
    wherein the prediction is further based on the likelihood of the resource being available within the given time period.

12. The secure resource management system of claim 11, wherein the first operations further comprise:
  in response to determining that the request for the prediction of the value of the resource is received, causing the resource value prediction subsystem to generate the prediction of the value of the resource.

13. The secure resource management system of claim 5, further comprising a resource value prediction subsystem comprising:
  a second processor; and
  a second non-transitory computer-readable medium comprising a second set of code executable by the second processor to perform second operations comprising:
    determining an amount of the resource available within the given time period; and
    generating a prediction of a loss of the resource by combining the likelihood of the resource being unavailable within the given time period and the amount of the resource associated with the given time period.

14. A non-transitory computer-readable storage medium having program code that is executable by a processor device to cause a computing device to perform operations, the operations comprising:
receiving a request to verify an authorized user of a resource and to provide a prediction of a value of the resource within a given time period;
responsive to receiving the request, querying a resource record repository to retrieve a resource record for the resource, the resource record repository configured for storing the resource record for the resource that comprises information of a resource provider of the resource, information of resource users having a right to obtain the resource, and a resource transaction history;
determining, based on the resource record, a resource user currently having a right to obtain the resource as the authorized user of the resource;
predicting a likelihood of the resource being available or unavailable within a given time period; and
transmitting, in response to the request, (i) a predicted value of the resource based at least in part on the likelihood of the resource being available or unavailable and (ii) a verification result to a remote computing device, the verification result identifying the authorized user of the resource and a remaining unused portion of the resource, wherein the verification result is useable to grant access to the resource by the authorized user.

15. The non-transitory computer-readable storage medium of claim 14, wherein the resource record repository is implemented in a public blockchain.

16. The non-transitory computer-readable storage medium of claim 14, wherein the resource record repository is implemented in a hybrid blockchain comprising a public blockchain and a private blockchain;
the public blockchain is configured to:
store an encrypted version of the resource transaction history contained in the resource record;
verify authenticity of a transaction involving the resource;
be accessible directly via a public data network; and
the private blockchain is configured to store the resource record and be accessible only by a secure resource management system.

17. The non-transitory computer-readable storage medium of claim 14, wherein the resource record repository is implemented in a secure database.

18. The non-transitory computer-readable storage medium of claim 14, wherein the operations further comprise:
receiving a resource transaction reporting message; and
updating the resource record repository based on the resource transaction reporting message.

19. The non-transitory computer-readable storage medium of claim 18, wherein the resource transaction reporting message comprises data describing a resource distribution or a resource transfer.

20. The non-transitory computer-readable storage medium of claim 14, wherein the operations further comprise:
determining an amount of the resource available within the given time period; and
generating the prediction of a value of the resource by combining the likelihood of the resource being available within the given time period and the amount of the resource available within the given time period.

* * * * *